United States Patent
Ying et al.

(10) Patent No.: US 6,940,548 B2
(45) Date of Patent: Sep. 6, 2005

(54) ANALOG OPTICAL BLACK CLAMPING CIRCUIT FOR A CHARGE COUPLED DEVICE HAVING WIDE PROGRAMMABLE GAIN RANGE

(75) Inventors: Feng Ying, Plano, TX (US); Yong Han, Plano, TX (US); Haydar Bilhan, Dallas, TX (US); Lieyi Fang, Plano, TX (US); Ramesh Chandrasekaran, Dallas, TX (US); Gary Lee, Plano, TX (US); Gonggui Xu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 670 days.

(21) Appl. No.: 09/995,118

(22) Filed: Nov. 27, 2001

(65) Prior Publication Data

US 2002/0033891 A1 Mar. 21, 2002

Related U.S. Application Data

(60) Provisional application No. 60/152,436, filed on Sep. 3, 1999, provisional application No. 60/092,912, filed on Jul. 15, 1998, and provisional application No. 60/251,024, filed on Dec. 4, 2000.

(51) Int. Cl.[7] .............................................. H04N 5/217
(52) U.S. Cl. ...................... 348/241; 348/243; 348/250
(58) Field of Search ................................. 348/241, 243, 348/250, 255, 222.1, 229.1, 697; 382/270, 274

(56) References Cited

U.S. PATENT DOCUMENTS

| | | | | |
|---|---|---|---|---|
| 4,827,351 A | * | 5/1989 | Sakamoto | 358/447 |
| 5,105,276 A | * | 4/1992 | Schrock | 348/241 |
| 5,157,500 A | * | 10/1992 | Gusmano | 348/241 |
| 5,573,550 A | | 11/1996 | Zadeh et al. | |
| 5,579,049 A | * | 11/1996 | Shimaya et al. | 348/364 |
| 5,757,440 A | * | 5/1998 | Mangelsdorf | 340/573.4 |
| 5,844,431 A | | 12/1998 | Chen | |
| 6,018,364 A | * | 1/2000 | Mangelsdorf | 348/241 |
| 6,346,968 B1 | * | 2/2002 | Domer et al. | 348/223.1 |
| 6,499,663 B1 | * | 12/2002 | Yahagi et al. | 235/462.28 |
| 6,587,144 B1 | * | 7/2003 | Kim | 348/241 |
| 6,791,607 B1 | * | 9/2004 | Bilhan et al. | 348/243 |
| 2001/0008420 A1 | * | 7/2001 | Opris | 348/223 |

* cited by examiner

Primary Examiner—Tuan Ho
Assistant Examiner—Yogesh Aggarwal
(74) Attorney, Agent, or Firm—April M. Mosby; W. James Brady, III; Frederick J. Telecky, Jr.

(57) ABSTRACT

An image processing apparatus (200) for a charge coupled device including analog front end circuitry having optical black and offset correction, whereby the offset and optical black correction circuit is programmable. The present invention includes a first circuit (202, 204, 206, 208, 210) to sample the incoming optical black signal output from a CCD. This first circuit includes a correlated double sampler (202) coupled to a first programmable gain amplifier (204). An adder (206) connects between the first programmable gain amplifier (204) and a second gain amplifier (208) for adding in the optical black offset to the optical black signal input from the CCD. A second circuit (212, 214) includes a reverse programmable gain amplifier (212) connected to the output of the second programmable gain amplifier (208) to amplify the optical black level inversely proportional to the gain from the second programmable gain amplifier (208). The second circuit (212, 214) also includes an integrator (214) coupled to the reverse programmable gain amplifier (212) to integrate the difference between the incoming signal and the desired optical black value. The second circuit (212, 214) couples to the adder (206) to add the positive and negative difference to the optical black signal. An analog-to-digital converter (210) converts the sampled signal for further processing at the output of the image processing apparatus (200).

36 Claims, 1 Drawing Sheet

ANALOG OPTICAL BLACK CLAMPING CIRCUIT FOR A CHARGE COUPLED DEVICE HAVING WIDE PROGRAMMABLE GAIN RANGE

CROSS-REFERENCE TO RELATED APPLICATION

The present invention relates to a copending application U.S. Application No. TBN, Filed Nov. 1, 2000, a continuation application from U.S. application Ser. No. 09/353,919, filed Jul. 15, 1999 which claims priority under 35 U.S.C. § 119(e)(1) of provisional application No. 60/092,912, filed Jul. 15, 1998. In addition, the present invention relates to a copending application entitled "A CMOS Analog Front End Architecture with Variable Gain for Digital Cameras and Camcorders," U.S. application Ser. No. 09/654,192, filed Sep. 1, 2000, which claims priority under 35 U.S.C. § 119(e)(1) of provisional application No. 60/152,436, filed Sep. 3, 1999 and claims benefit of 60/251,024, filed Dec. 4, 2000.

FIELD OF THE INVENTION

The present invention relates to image processing, and, more particularly, to an analog front end for a charge coupled device and CMOS imager, which provides analog optical black and offset correction having a wide gain range.

BACKGROUND OF THE INVENTION

Advances in integrated circuit design and manufacturing have enabled low cost, highly integrated, high performance image processing products, including the digital electronic cameras. A conventional camera comprises an image sensor, typically an array charge coupled device (CCD), an analog front end (AFE) and a digital image processor. The CCD is an integrated array of photocells used in digital imaging. Most analog front ends having optical black and offset calibration include schemes that integrate the error signal across a capacitor during an optical black period and feed back the voltage generated to the input to cancel the offset or the optical black value during the video interval.

As shown in circuit 100 of FIG. 1, a CCD (not shown) is connected to an AC coupling capacitor C, that clamps the direct current (DC) value of the input signal. An AFE connected to the capacitor $C_1$ includes three main elements: a correlated double sampler 102 (CDS), a programmable gain amplifier 104 (PGA), and an analog to digital converter 106 (ADC). The signal output from PGA 104 feeds back into integrator 108. The feed back loop forms an optical black correction loop where the error signal is integrated and fed back to CDS 102. Integrator 108 couples to reverse programmable gain amplifier (RPGA) 110, the output of which feeds into CDS 102. As shown, the analog optical black level is sampled before it is digitized by ADC 106. Note, however, that the PGA 104 gain is in the optical black correction loop. RPGA 110 maintains the stability of the loop since its gain is inversely proportional to the PGA 104 gain. Since PGA 104 has gain range of one to fifty, RPGA 110 has an adjustable range corresponding to the reciprocal of the gain of PGA 104. If the circuit is implemented with switched capacitors, gain is achieved using the capacitor ratio. A wide gain range, however, requires either extremely large capacitor or extremely small capacitor.

Moreover, the loop gain of the correction circuit changes when the programmable gain changes. In order to keep the loop gain constant, the loop gain needs to be changed significantly because the programmable gain can change from 0 to 36 dB. In addition, this approach relies on device matchings which may cause a yield issue.

Thus, there exists a need for an analog optical black and offset correction circuit for CCD signal processing having a wide gain range that does not require a large capacitor or an extremely small capacitor.

SUMMARY OF THE INVENTION

To address the above-discussed deficiencies of the analog front end circuitry having optical black and offset correction, the present invention teaches an offset and optical black correction circuit having a wide gain range. A first embodiment of the image processing apparatus in accordance with the present invention includes a first circuit to sample the incoming optical black signal output from a CCD. This first circuit includes a correlated double sampler coupled to a first programmable gain amplifier. An adder connects between the first programmable gain amplifier and a second gain amplifier for adding in the optical black offset to the optical black signal input from the CCD. A second circuit couples to the first circuit to provide a feedback loop for the first circuit. It includes a reverse programmable gain amplifier connected to the output of the second programmable gain amplifier to amplify the optical black level inversely proportional to the gain from the second programmable gain amplifier. The second circuit also includes an integrator coupled to the reverse programmable gain amplifier to integrate the difference between the incoming signal and the desired optical black value. The second circuit couples to the adder to add the positive and negative difference to the optical black signal. An analog-to-digital converter converts the sampled signal for further processing at the output of the image processing apparatus.

The image processing apparatus may be implemented using switch capacitors. In addition, this design provides further flexibility in that the programmable gain amplifiers and the reverse programmable gain amplifier may be implemented using single-ended or differential amplifiers.

Advantages of this design include but are not limited to an analog front end circuit having mixed signal optical black and offset circuitry that is highly programmable. This circuit has an improved dynamic range for image processing over other approaches. As such, this highly programmable design can be used both in discrete and continuous time systems and does not require any off-chip components.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

Detailed Description of Preferred Embodiments

Figure 1:
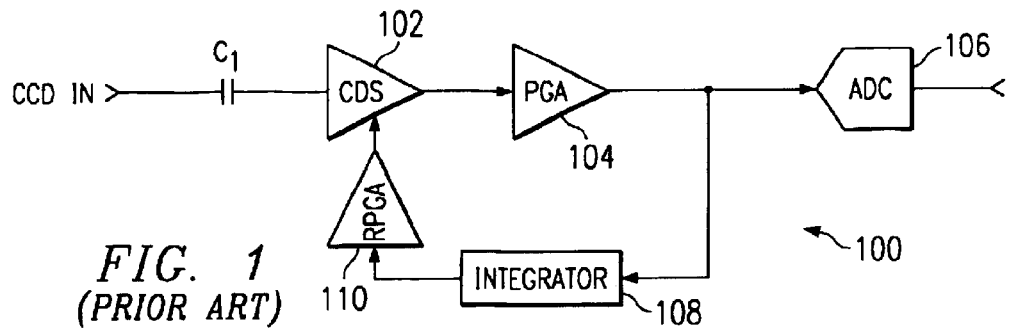
FIG. 1 is a block diagram of a known embodiment of an analog front end for a CCD.
Figure 2:
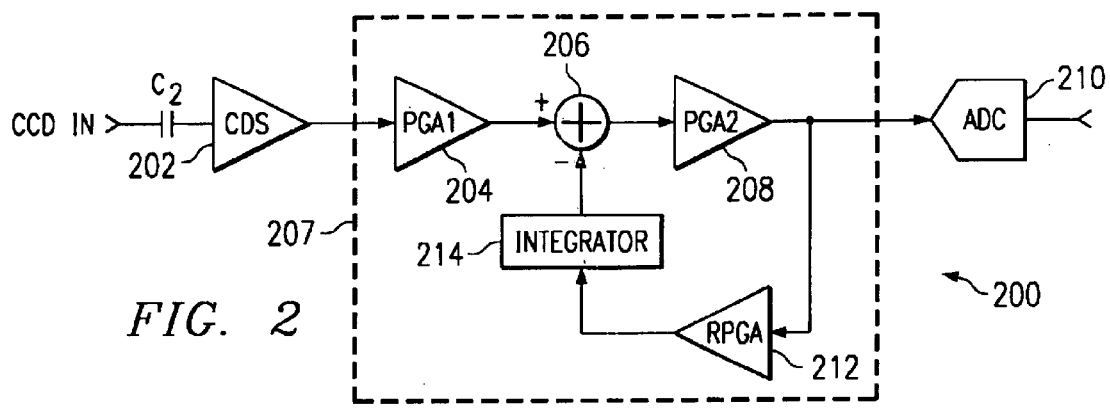
FIG. 2 is a block diagram of an embodiment of an analog front end for a CCD in accordance with the present invention.

In accordance with the present invention, the sum of the channel offset and optical black level is averaged using an analog low-pass filter. Particularly, a first embodiment of an analog front end circuit 200 in accordance with the present invention is shown in FIG. 2. This circuit 200, which receives an input signal from a CCD, provides a CCD signal processing method for optical black offset correction. AFE 200 receives a CCD input. Capacitor $C_2$ is an AC coupling capacitor that clamps the direct current (DC) value of the error signal. CDS 202 couples between capacitor $C_2$ and a first PGA 204 which amplifies the error signal. An adder 206 receives the output from PGA 204 and supplies the signal to a second PGA 208. The output of PGA 208 is fed back to RPGA 212 which transfers the error signal to integrator 214. Integrator 214 averages the error signal and couples to adder 206 to sum the output of the first PGA 204.

This embodiment splits the PGA into two stages a first PGA 204 and a second PGA 208. The correction signal is fed back to a point after PGA 204 and before PGA 208 leaving only PGA 208 within the optical black control loop. Effectively, the output from PGA 208 within the correction loop cancels the error of PGA 204. The range of PGA 208 may be from 1 to 4. Accordingly, the RPGA 212 has an adjustable gain range proportional to the reciprocal of PGA 208 which is easier to implement than the conventional approach.

Figure 3:
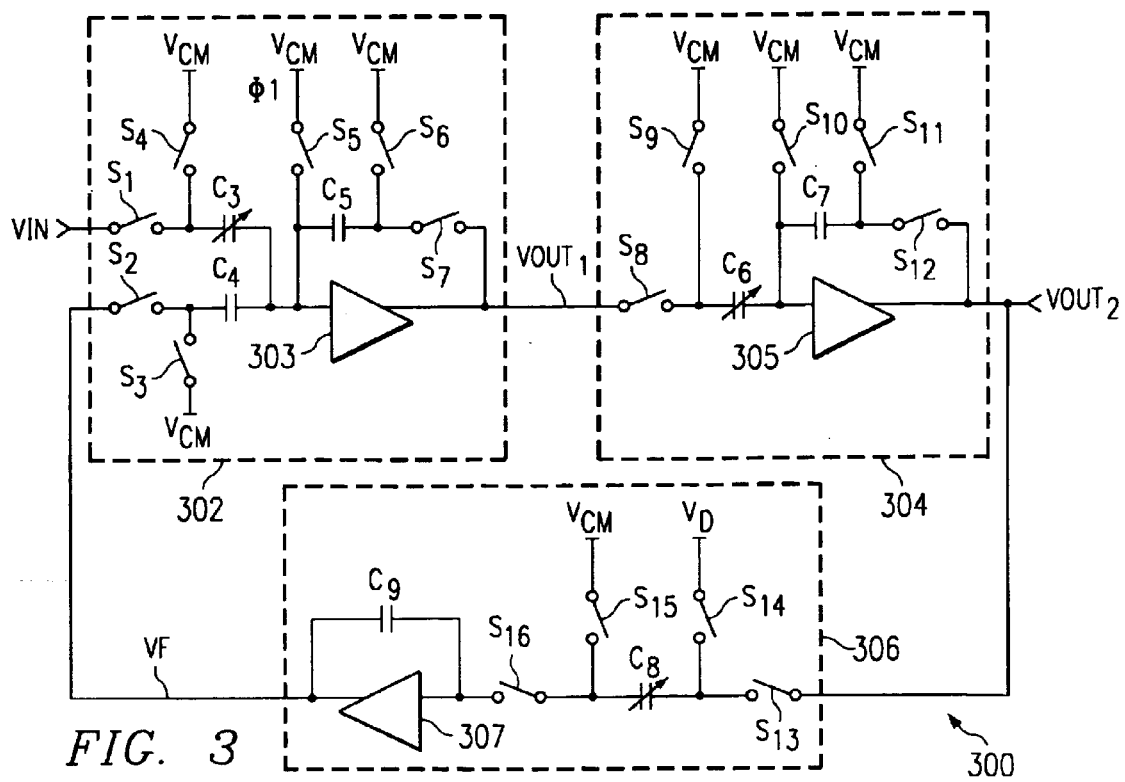
FIG. 3 is a switched-capacitor implementation of the analog front end of FIG. 2.

FIG. 3 illustrates a switched-capacitor implementation of the embodiment of circuit 207 of FIG. 2. This embodiment couples to receive a control signal (not shown) having a first and a second phase and an input signal from a CDS such as the CDS 202 shown in FIG. 2. The first PGA 302 includes switches, $S_1$–$S_7$, capacitors, $C_3$, $C_4$ and $C_5$, and operational amplifier 303. The second PGA 304 coupled to PGA 302 includes switches, $S_8$–$S_{12}$, capacitors, $C_6$ and $C_7$, and operational amplifier 305. Integrator 306 includes switches, $S_{13}$–$S_{16}$, capacitors, $C_8$ and $C_9$, and operational amplifier 305. Voltage $V_b$ is the targeted optical black level. Common-mode voltage VCM is supplied through switches $S_3$, $S_4$, $S_5$, $S_6$, $S_9$, $S_{10}$, $S_{11}$ and $S_{15}$. For simplicity, only the upper half of the fully differential amplifiers 303, 305 and 307 are shown. It would be apparent to those skilled in the art that the connections that appear on the positive half of each differential amplifier 303, 305 and 307 appear on the respective negative half.

Circuit 300 is controlled by the control signal having a first and a second phase, $\phi_1$ and $\phi_2$. In operation, during the first phase $\phi_1$ of a control signal for the analog front end circuit 300, switches $S_1$, $S_2$, $S_5$, $S_6$, $S_9$, $S_{12}$, $S_{13}$, and $S_{15}$ close, while all others remain open. The converse is true during the second phase $\phi_2$ of the control signal: switches $S_3$, $S_4$, $S_7$, $S_8$, $S_{10}$, $S_{11}$, $S_{14}$, and $S_{16}$ close, while all others remain open. Thus, during the first phase $\phi_1$ within a first cycle of the control signal, the input signal is stored by capacitor $C_3$ and the correction signal $V_f$ is stored by capacitor $C_4$. During the second phase $\phi_2$ within the first cycle of the control signal, the input signal is amplified by differential amplifier 303 to yield an output $V_{out1}$. Switches $S_3$, $S_4$, $S_7$, $S_8$, $S_{10}$, and $S_{11}$ close, enabling capacitors $C_5$ and $C_6$ to charge up to voltage $V_{out1}$ and capacitor $C_7$ to charge up to voltage $V_{CM}$. During a first phase $\phi_1$ within a second cycle of the control signal, capacitor $C_7$ charges to voltage $V_{out2}$, since switch $S_9$ and $S_{12}$ close. In addition, switches $S_{13}$ and $S_{15}$ close to effectively charge capacitor $C_8$ to voltage $V_{out2}$. During the second phase $\phi_2$ within the second cycle of the control signal, switches $S_{14}$ and $S_{16}$ close to charge capacitor $C_8$ to the difference between voltages $V_{out2}$ and $V_b$, the desired optical black value. Differential amplifier 307 amplifies signal $V_{out2}$ inversely proportional to the gain of amplifier 305. As a result, capacitor $C_9$'s charge increases by a fraction of the difference between voltages $V_{out2}$ and $V_b$. The output of integrator 306 provides a correction signal or feedback voltage $V_f$ which couples into the first programmable gain amplifier 302 as shown.

Specifically, gain $G_1$ of PGA1 302 is:

$$G_1 = C_3/C_5 \quad [1]$$

where capacitor $C_3$ varies and capacitor $C_5$ is constant. The output $V_{out1}$ of PGA 302 is:

$$V_{out1} = G_1 * V_{in} + (C_4/C_5) * V_f \quad [2]$$

Where $C_4$ is also constant. The output of PGA 304 is $$V_{out2} = G_2 * V_{out1} = G_2 * G_1 * V_{in} + G_2 * (C_4/C_5) * V_f \quad [3]$$

As shown in the equation above, the correction signal $V_f$ is only amplified by gain of PGA 304, $G_2$, not by gain $G_1$ of PGA 302. Since gain $G_1$ of PGA 302 is adjusted by changing sampling capacitor $C_3$ instead of feedback capacitor, the correction signal $V_f$ is not amplified by PGA 302. Thus, the correction signal is effectively injected after PGA 302 and before PGA 304.

Integrator 306 acts as a reverse programmable gain amplifier and integrator. To maintain a constant loop gain, the RPGA gain of integrator 306 only needs to adjust when gain $G_2$ changes. Since the variation of gain $G_2$ is already greatly reduced, if the loop gain requirement is not strict we may use a constant RPGA gain within integrator 306 which simplifies the design significantly.

The advantage of the present invention includes but is not limited to a CMOS AFE having optical black correction where device matching is relaxed for the voltage comparison. This is a key improvement over other approaches specifically for designs that use smaller capacitors.

In the alternative, another embodiment in accordance with the present invention may include a single-ended amplifier implementation to substitute for the differential amplifier implementation shown in FIG. 3.

The present invention finds application in a great many video systems including digital still cameras, digital video cameras, digital video processing systems, CCD signal processors, and CMOS imagers, in a variety of industrial, medical, and military sensor and imaging applications.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An image processing apparatus having offset and optical black correction circuit coupled to receive a control signal having a first and second phase and an optical black signal from a charge coupled device, comprising:

a. a first circuit to sample the optical black signal at a predetermined reference voltage, the first circuit comprises
  i. a correlated double sampler,
  ii. a first and second programmable gain amplifier, the first programmable gain amplifier coupled to the correlated double sampler,
  iii. an adder coupled between the first and second programmable gain amplifiers, and
  iv. an analog-to-digital converter coupled to the second programmable gain amplifier for converting the sampled signal into a digital signal;
b. a second circuit to correct the optical black offset coupled to the first circuit, wherein the second circuit couples between the adder and the second programmable gain amplifier to add the positive and negative differnce to the optical black signal, the second circuit comprises
  i. a reverse programmable gain amplifier coupled to the analogto-digital converter to amplify the optical black level of the digital signal; and
  ii. an integrator coupled to the reverse programmable gain amplifier to detect the optical black level of the digital signal; wherein the integrator couples to the adder.

2. The image processing apparatus as recited in claim 1, wherein the first programmable gain amplifier comprises
a first and second sampling circuit;
a differential amplifier having a first and second input and a first and second output, the first sampling circuit coupled to the first input, the second sampling circuit coupled to the second input; and
a first and second feedback circuit, the first feedback circuit coupled between the first input and the first output, the second feedback circuit coupled between the second input and the second output.

3. The image processing apparatus as recited in claim 2, wherein the first sampling circuit comprises
a first and second sampling switch;
a first sampling variable capacitor coupled to the first sampling switch;
a second sampling capacitor coupled to the second sampling switch;
a third feedback switch coupled between a power supply providing a common-mode voltage for the image processing apparatus and the first sampling variable capacitor; and
a fourth feedback switch coupled between a power supply providing a common-mode voltage for the image processing apparatus and the second sampling capacitor.

4. The image processing apparatus as recited in claim 3, wherein the first and second sampling switch closes on the first phase of the control signal and wherein the third and fourth sampling switch closes on the second phase of the control signal.

5. The image processing apparatus as recited in claim 3, wherein the second sampling circuit is equivalent to the first sampling circuit.

6. The image processing apparatus as recited in claim 2, wherein the first feedback circuit comprises:
a first and second feedback switch coupled to a power supply providing a common-mode voltage for the image processing apparatus;
a feedback capacitor coupled between the first and second feedback switches; and
a third feedback switch coupled between the feedback capacitor and the first output node of the amplifier, wherein the first output of the differential amplifier couples to the adder.

7. The image processing apparatus as recited in claim 6, wherein the first and second sampling switch closes on the first phase of the control signal, wherein the third sampling switch closes on the second phase of the control signal.

8. The image processing apparatus as recited in claim 6, wherein the second feedback circuit is equivalent to the first feedback circuit.

9. The image processing apparatus as recited in claim 1, wherein the first programmable gain amplifier comprises:
a sampling circuit;
an amplifier having an input and an output, the sampling circuit coupled to the input; and
a feedback circuit coupled between the input and the output.

10. The image processing apparatus as recited in claim 9, wherein the sampling circuit comprises:
a first and second sampling switch;
a first sampling variable capacitor coupled to the first sampling switch;
a second sampling capacitor coupled to the second sampling switch;
a third feedback switch coupled between a power supply providing a common-mode voltage for the image processing apparatus and the first sampling variable capacitor; and
a fourth feedback switch coupled between a power supply providing a common-mode voltage for the image processing apparatus and the second sampling capacitor.

11. The image processing apparatus as recited in claim 10, wherein the first and second sampling switch closes on the first phase of the control signal and wherein the third and fourth sampling switch closes on the second phase of the control signal.

12. The image processing apparatus as recited in claim 9, wherein the feedback circuit comprises:
a first and second feedback switch coupled to a power supply providing a common-mode voltage for the image processing apparatus;
a feedback capacitor coupled between the first and second feedback switches; and
a third feedback switch coupled between the feedback capacitor and the first output node of the amplifier, wherein the first output of the differential amplifier couples to the adder.

13. The image processing apparatus as recited in claim 12, wherein the first and second sampling switch closes on the first phase of the control signal, wherein the third sampling switch closes on the second phase of the control signal.

14. The image processing apparatus as recited in claim 1, wherein the second programmable gain amplifier comprises:
a first and second sampling circuit;
a differential amplifier having a first and second input and a first and second output, the first sampling circuit coupled to the first input, the second sampling circuit coupled to the second input; and
a first and second feedback circuit, the first feedback circuit coupled between the first input and the first output, the second feedback circuit coupled between the second input and the second output.

15. The image processing apparatus as recited in claim 14, wherein the first sampling circuit comprises:

a first sampling switch;
a sampling variable capacitor coupled to the first sampling switch; and
a second sampling switch coupled between the sampling variable capacitor and a power supply providing a common-mode voltage for the image processing apparatus.

16. The image processing apparatus as recited in claim 15, wherein the first sampling switch closes on the second phase of the control signal and the second sampling switch closes on the first phase of the control signal.

17. The image processing apparatus as recited in claim 14, wherein the second sampling circuit is equivalent to the first sampling circuit.

18. The image processing apparatus as recited in claim 14, wherein the first feedback circuit comprises:
a first and second feedback switch coupled to a power supply providing a common-mode voltage for the image processing apparatus;
a feedback capacitor coupled between the first and second feedback switches; and
a third feedback switch coupled between the feedback capacitor and the first output node of the amplifier, wherein the first output of the differential amplifier couples to the adder.

19. The image processing apparatus as recited in claim 18, wherein the first and second feedback switch closes on the first phase of the control signal, wherein the third feedback switch closes on the second phase of the control signal.

20. The image processing apparatus as recited in claim 14, wherein the second feedback circuit is equivalent to the first feedback circuit.

21. The image processing apparatus as recited in claim 1, wherein the second programmable gain amplifier comprises:
a sampling circuit;
an amplifier having an input and an output, the sampling circuit coupled to the input; and
a feedback circuit coupled between the input and the output.

22. The image processing apparatus as recited in claim 21, wherein the sampling circuit comprises:
a sampling switch; and
a first sampling variable capacitor coupled to the first sampling switch.

23. The image processing apparatus as recited in claim 22, wherein the sampling switch closes on the second phase of the control signal.

24. The image processing apparatus as recited in claim 21, wherein the feedback circuit comprises:
a first and second feedback switch coupled to a power supply providing a common-mode voltage for the image processing apparatus;
a feedback capacitor coupled between the first and second feedback switches; and
a third feedback switch coupled between the feedback capacitor and the first output node of the amplifier, wherein the first output of the differential amplifier couples to the adder.

25. The image processing apparatus as recited in claim 24, wherein the first and second sampling switch closes on the first phase of the control signal, wherein the third sampling switch closes on the second phase of the control signal.

26. An image processing apparatus having offset and optical black correction circuit coupled to receive a control signal having a first and second phase and an optical black signal from a charge coupled device, comprising:

a first circuit to sample the optical black signal at a predetermined reference voltage, the first circuit comprises:
a correlated double sampler,
a first and second programmable gain amplifier, the first programmable gain amplifier coupled to the correlated double sampler, and
an adder coupled between the first and second programmable gain amplifiers, wherein the correction circuit couples to the adder to add the positive and negative difference to the optical black signal;
an analog-to-digital converter coupled to the second programmable gain amplifier for converting the sampled signal into a digital signal; and
a second circuit to correct the optical black offset coupled to the first circuit, the second circuit comprises:
a first and second sampling circuit,
a differential amplifier having a first and second input and a first an second output, the first sampling circuit coupled to the first input, the second sampling circuit coupled to the second input, and
a first and second feedback circuit, the first feedback circuit coupled between the first input and the first output, the second feedback circuit coupled between the second input and the second output.

27. The image processing apparatus as recited in claim 26, wherein the first sampling circuit comprises:
a first and second sampling switch, the first sampling switch coupled to a power supply providing a common-mode voltage for the image processing apparatus, second sampling switch coupled to a predetermined optical black value;
a third and fourth sampling switch; and
a sampling variable capacitor having a first and second end, the first and third sampling switches coupled to the first end of the sampling variable capacitor, the second and fourth switch coupled to the second end of the sampling variable capacitor.

28. The image processing apparatus as recited in claim 27, wherein the first and fourth sampling switch closes on the first phase of the control signal, wherein the second and third sampling switch closes on the second phase of the control signal.

29. The image processing apparatus as recited in claim 26, wherein the second sampling circuit is equivalent to the first sampling circuit.

30. The image processing apparatus as recited in claim 26, wherein the first feedback circuit comprises:
a feedback capacitor.

31. The image processing apparatus as recited in claim 30, wherein the second feedback circuit is equivalent to the first feedback circuit.

32. An image processing apparatus having offset and optical black correction circuit coupled to receive a control signal having a first and second phase and an optical black signal from a charge coupled device, comprising:
a first circuit to sample the optical black signal at a predetermined reference voltage, the first circuit comprises
a correlated double sampler,
a first and second programmable gain amplifier, the first programmable gain amplifier coupled to the correlated double sampler, and
an adder coupled between the first and second programmable gain amplifiers, wherein the correction circuit couples to the adder to add the positive and negative difference to the optical black signal;

an analog-to-digital converter coupled to the second programmable gain amplifier for converting the sampled signal into a digital signal;

a second circuit coupled to the first circuit to correct the optical black offset, the second circuit comprises:
   a sampling circuit;
   an amplifier having an input and an output, the sampling circuit coupled to the input; and
   a feedback circuit coupled between the input and the output, the feedback circuit coupled to the adder.

33. The image processing apparatus as recited in claim 32, wherein the sampling circuit comprises:
   a first and second sampling switch, the first sampling switch coupled to a power supply providing a common-mode voltage for the image processing apparatus, second sampling switch coupled to a predetermined optical black value;
   a third and fourth sampling switch; and
   a sampling variable capacitor having a first and second end, the first and third sampling switches coupled to the first end of the sampling variable capacitor, the second and fourth switch coupled to the second end of the sampling variable capacitor.

34. The image processing apparatus as recited in claim 33, wherein the first and fourth sampling switch closes on the first phase of the control signal, wherein the second and third sampling switch closes on the second phase of the control signal.

35. The image processing apparatus as recited in claim 32, wherein the feedback circuit comprises a feedback capacitor.

36. An image processing method comprising the steps of:
   converting a signal of reflected light off of an object photoelectrically to obtain an optical black signal;
   generating a predetermined reference voltage;
   clamping the optical black signal to a predetermined reference voltage;
   amplifying the optical black signal by a first gain of a first programmable gain amplifier;
   amplifying the optical black signal by a second gain of a second programmable gain amplifier;
   feeding back the amplified signal to a reverse programmable gain amplifier;
   amplifying the optical black signal by the inverse of the second gain; and
   adding the amplified optical black signal to the optical black signal after the first programmable gain amplifier.

* * * * *